Dec. 6, 1932.   G. A. MONTGOMERY   1,889,871
ROTARY DRILL STEM, ITS TUBE AND COLLAR
Original Filed June 24, 1929
FIG.1.   FIG.2.   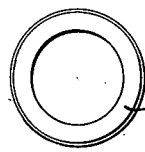FIG.6.
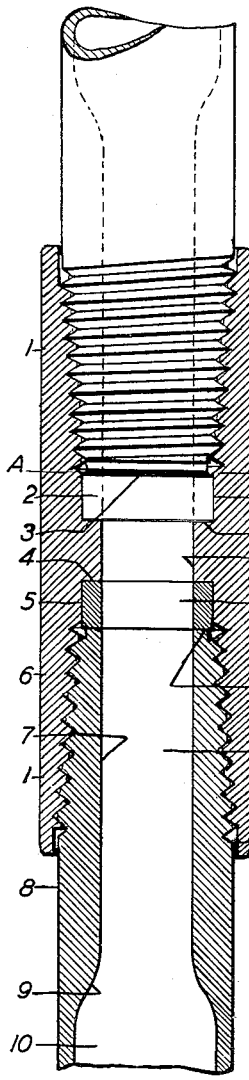 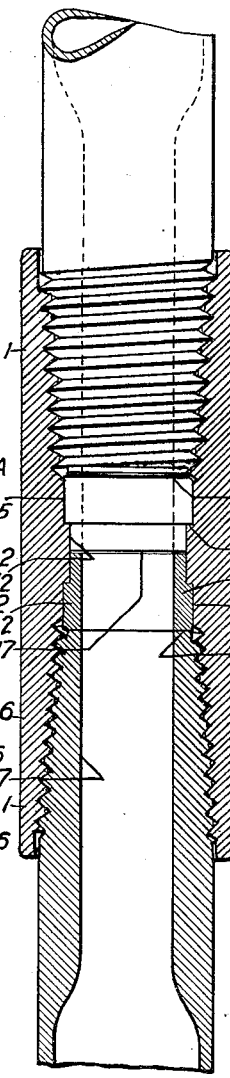
FIG.7.
FIG.3.
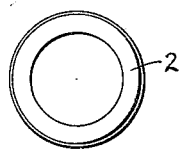 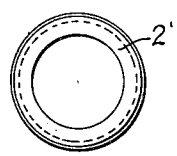
FIG.4.   FIG.5.
GUSTAVUS. A. MONTGOMERY.
INVENTOR.
BY Jesse R. Stone
ATTORNEYS.

Patented Dec. 6, 1932

1,889,871

UNITED STATES PATENT OFFICE

GUSTAVUS A. MONTGOMERY, OF DALLAS, TEXAS

ROTARY DRILL STEM, ITS TUBE AND COLLAR

Original application filed June 24, 1929, Serial No. 373,355. Divided and this application filed June 25, 1931. Serial No. 546,788.

This invention relates to an improvement in hollow shafting and couplings employed therewith for transmitting relatively heavy torque and high hydraulic flow; the device is utilized in the rotary method of drilling, and the said couplings and tube sections make up what is ordinarily termed the rotary drill stem.

This is a division of the application originally filed by me June 24th, 1929, Serial Number 373,355.

The object of this invention is to provide a workable combination of tube sections and couplings therefor, capable of transmitting by their threaded connections, a torque that is greater than the shearing strength of the tube at its weakest point; and to seal the interior high pressure liquids within the tube from leakage at the coarsely threaded connections, and to make the threaded connections capable of repeated unscrewing and screwing together, said sealing function being primarily accomplished by the incorporation of a ring or other annulus in the coupling sleeve of a greater hardness than the sleeve or the tube sections abuttable therewith.

Another object of the invention is to provide a coupling sleeve having a ring or other formation incorporated therewith of a hardness greater than the member which the sleeve is intended to couple in order to prevent end union of said member and the ring when the two are connected in a sealing off engagement.

A further object of the invention is to provide a coupling in which the distortion of the threads by tempering requires no correction after tempering, because the separately hardened stop ring is used as a gauging point. The properly sized and relatively hard stop ring is pressed into place after the coupling is hardened for ductility. This will greatly increase manufacture tolerances, and lessen cost of inspection and rejections, but will increase final accuracy, interchangeability, and ductility.

Referring to the drawing, Fig. 1 is a central longitudinal section through the tube and coupling sleeve, showing a cylindrical form of interior reinforcement in the tube required to form sufficient tube end thrust area to cooperate with the thrust and seal ring employed within the coupling.

Fig. 2 is a central longitudinal cross-section through the tube and sleeve, showing the interior reinforcement parallel to the axis of the tube and with inserted hardened thrust rings.

Fig. 3 is a central longitudinal cross section through a tube similar to that shown in Fig. 2, provided with a sleeve which has a cylindrical knurled or otherwise corrugated shoulderless central bore midway the threaded boxes, said bore having therein a knurled or otherwise exteriorly grooved and hardened end thrust ring shown partly in section, the interior upset being parallel with the exterior conical pin.

Fig. 4 is an end view of the separately hardened thrust, seal and gage ring shown in Fig. 1.

Fig. 5 is an end view of the separately hardened thrust, seal and gage ring shown in Fig. 2.

Fig. 6 is end view of the separately hardened thrust, seal and gage ring shown in Fig. 3.

Fig. 7 is a side view partly in section of one of the drill pipe sections in accordance with Fig. 1.

In carrying out my invention, I provide for the use of a double ended coupling sleeve 6 having acutely tapered boxes 1 at each end. These boxes are coarsely threaded and are interchangeable and reversible end for end when wear occurs, the threads in the boxes and on the pin ends being the connecting means of the coupling. Between the ends of the box is an inwardly projecting flange having opposite shoulders 4 against which are seated the thrust and seal rings 2 or other annuli herein also known as combined stop and gauge members. The inner wall of the coupling sleeve is formed cylindrical at 5 adjacent the flange to receive the said rings 2 which are of hard material faced to abut against the ends 3 of the pipe sections and form a seal therewith. These rings and their equivalent in Figure 3 are harder than their associated structure (sleeve 6 and the pipe screwed therein), in fact are what is known as "glass-hard." It will be observed from Fig. 1 that the rings 2 are of the same thickness as the flange, and both are flush with the inner bore 7 of the pipe 8.

The pipe 8 is formed with a coarsely threaded tapered pin 16 at each end and has its interior upset to allow for a thickened end, cylindrical on its interior at 15 to a point beyond the end of the coupling sleeve, and providing an end face of an area ample to form a seal-off with the ring 2 the opposite faces of which are of an area substantially equal to the adjacent pin face. The end of the pipe makes a fluid seal with the seal ring 2 which limits the inward screwing of the pipe within the box. The said ring is pressed and tightly fitted in place to remain permanently and therefore become integral with the sleeve 6, and the outer end faces are highly polished to make the foregoing seal. Thus, the contact of the pipe ends with said rings acts to prevent accidental unscrewing, but their frictional engagement with the pipe ends allows the pipe to be disengaged when the pipe sections are to be disconnected.

The rings are also utilized as gauge points to limit the insertion of the pins in the boxes. In order to preserve the principle of the joint it is necessary to insure the tensioning (outward expansion) of the box and the compression of its pin below the elastic limit of the metal. These factors obtain upon the occasion of a full thread contact, characteristic of the coarse threading herein adopted, and when the full thread contact is established there will be lateral or radial stresses between the box and pin which when gauged by the stop ring to a point below the elastic limit of the metal can be utilized to transmit what may aptly be described as the useful reverse torque.

This term must be understood, and is most easily understood by reflecting for a moment the happenings in the well bore. The rotary at the top revolves the drill stem, but sometimes there will be a temporary obstruction at the bottom that serves to hold the drilling tool back and incidently cause a twist in the drill stem, it being remembered that the rotary continues its forward driving function with substantial uniformity. When the obstruction at the bottom is overcome the relaxation of the twist in the drill stem will tend to cause it to spring forwardly in the direction of rotation, in other words momentarily turn ahead of the driving effort of the rotary. This sets up a reverse torque in the drill stem, and the effect of this reverse torque is to unscrew the drill stem at one or more of its couplings.

Now, with every pin and box so gauged that the foregoing reverse torque will be disseminated by a relaxing effort in the pins and boxes it follows that there can be an infinitesimal unscrewing effect in each pin and box without breaking the seal between the ring and the pin end.

It is easy to understand that without the ring and stop the screwing in of each pin, such screwing may easily be carried beyond the elastic limit of the metal so that no useful reverse torque would result. The joint would then become too tight. The reader must not gain the impression that a tight joint is not desirable. The point is that the instant coupling is designed to enable breaking out of the pin or disassemblage of the coupling at the surface.

If the pin were screwed in so tight that no relaxation could take place in the bore under the circumstances named then it would also be impossible to disassemble the joint when necessary at the surface. To summarize, the pin is screwed into the box sufficiently hard to make an absolute seal against the ring yet leave enough laxity in the threads to permit breaking out at the surface, said laxity, when not permitting an infinitesimal unscrewing in the well bore, being insufficient to disturb the seal-off between the pin end and ring.

From what has been said it must be understood that the ring is essential as a gauge point for determining the amount of screwing in of the pin. If the ring is too short in the axial direction the pin will be screwed in beyond the elastic limit of the metal. If the ring is too long in the axial direction the pin will not be screwed in far enough. The ring will be accurately gauged before being put into place so that the components of tension and compression respectively on the box and pin will be exactly right when the pin is screwed home.

As previously indicated, the joint at 3 serves to seal the liquids within the tubes, thus the seal is not in the threads but in the end 3 of the tube. Therefore, within certain limits the threads need not be as good fit nor finish as they must be when the pressure fluid seal is in the threads. Fluid seal of high pressure liquids by coarse threads is difficult of accomplishment. In transportation and use, the ordinary tube threads often get damaged beyond use as pressure seals, but when the seal is in end of tube, as at 3, damage to threads is of small or no consequence.

In Fig. 2, the inner bore 12 being of greater internal diameter than in case of the form shown in Fig. 1, the thrust rings 2 are projected into bore 12, so that their inner ends are separated by a small space 17, and in no case can the two thrust rings touch or rotate together if by accident they ever would become loosened. Each ring 2 has an end flange engaging the shoulder 4. Because of the shortness of the shoulder 4, this coupling can be cheaply manufactured from solid pierced steel tubes instead of forging.

Fig. 3 shows a modified means of attaching the thrust and seal ring to the coupling sleeve 6. The bore 13 between the threaded boxes has no shoulders upon which to support thrust rings, but instead, the thrust ring 14 is made preferably in one piece and the bore 13 and the outer surface 17a of the thrust ring are knurled or grooved to prevent the ring 19 from rotating under any circumstance after it has been pressed into place. The outer ends 18 of the ring 19 form seal and thrust surfaces, and serve also as the gauging points for regulating the sizes of the boxes 1 in the same manner as do the thrust rings in Figs. 1 and 2. If the thrust ring 19 should turn in unison with one of the drill stem sections when one of the sections is being screwed tight, the tube in the opposite end would tend to unscrew resulting in a loose joint. The construction shown in Fig. 3 will prevent such a thing as the ring is fixed.

One of the features of my invention is the structure of the ends of the drill pipe sections shown in Figs. 1 and 7 both as to their outer and inner structure. The ends have longer and coarser threads of greater taper than has been before used for the purpose to which this device is intended, and have the enlarged end thrust surfaces 3, preferably at right angles to the axis of the tube. This is only one form which I contemplate however, for the ends may be given a beveled face or even a self aligning spherical one. The end surface 3 of the tube is always highly finished and hardened, but the degree of hardening does not equal that of the stop rings, the purpose of making the stop rings hardest being to prevent end union or sizing of the metals when the pin ends are screwed home under the customarily enormous torques. The inner reinforcement or upset 7 is cylindrical at the coupling, the upset portion merging with the pipe wall 10 by slopes 9. The upset feature is carried beyond the outer threaded section and the end of collar a length equal to thickness of the rotary tongs used to screw the joints together. It prevents crushing of the tube by the pipe tongs. The flow of liquid through the joint is also without appreciable turbulence due to the streamline effect of the upset. My couplings and pipe ends are formed to cooperate in providing a light joint, cheaply manufactured, and simple to operate. The couplings, being reversible, will last relatively long.

Most pipe threads in the past have been relatively short and of small taper and fine pitch, and were threaded in threading machines, using dies or chasers. The longer thread of coarse pitch and acute taper does not lend itself to using such threading equipment, particularly when the tube end is to be highly finished and aligned and specially formed as shown. Therefore, the threads are to be milled, producing truer and more concentric threads, with axial alignment of threads in both ends; accurate, beyond that of the usual pipe threads, when threaded in the old way.

It is a prerequisite for a good drill stem connection that it can be connected and disconnected without excessive, destructive tonging pressure, and loss of time. Therefore, the taper, pitch, thread helix, and number of threads, whether one, or multiple, play an important part in the new break-out joint, one or all of these factors being subject to such modifications as the many sizes of rotary drill stems used require, but in all cases, the threads must clear, or completely make up in very few revolutions in spite of the relatively long thread, therefore, various changes in the size, pitch, number of threads, single or multiple, or taper are considered as coming within the scope of the claims.

What I claim is:

1. In a hollow shafting subject to a torque and for transmitting a fluid, a tapered threaded pin thereon, a coupling sleeve having a relatively long acutely tapered and threaded box in one end adapted to receive the pin of said shafting, said box inwardly of its outer end having a cylindrical bore, a separate hardened ring in said bore, the outer surface of the ring confronting the surface of the bore, one of said surfaces being knurled to establish a grip to prevent turning of the ring, said ring having its extremity engaged by said pin to form a fluid tight seal between the interior of the sleeve and said shafting.

2. A coupled well string assemblage subject to a torque and for transmitting a fluid comprising a coupling sleeve having a coarsely taper-threaded box, a tube section having a correspondingly taper-threaded pin screwed into the box, the end of the pin being finished concentrically with the axis of the pin, and a ring structure to be abutted by the pin end and having the abuttable surface correspondingly finished to establish a fluid seal, said structure being fixed in the sleeve and consisting of rigid material of sufficient hardness to prevent deformation, said structure further being precisely gauged in its longitudinal dimension to enable the predetermination of the total length of said string and to limit the screwing in of the pin to an extent below the elastic limits of the pin and box.

3. A coupled well string assemblage subject to a torque and for transmitting a fluid comprising a coupling sleeve having a coarsely taper-threaded box and an internal flange, a tube section having a correspondingly taper-threaded pin screwed into the box, the end of the pin being finished concentrically with the axis of the pin, and a ring structure to be abutted by the pin end having the abuttable surface correspondingly finished to establish a fluid seal, said structure being fixed on the flange in the sleeve and consisting of rigid material of sufficient hardness to prevent deformation, said structure being precisely gauged in its longitudinal dimension to enable the predetermination of the total length of said string and to limit the screwing in of the pin to an extent below the elastic limits of the pin and box.

In testimony whereof, I hereunto affix my signature, this the 15th day of June, A. D. 1931.

GUSTAVUS A. MONTGOMERY.